F. A. THAYER.
Improvement in Combined Hay-Rakes and Tedders.
No. 114,065. Patented April 25, 1871.
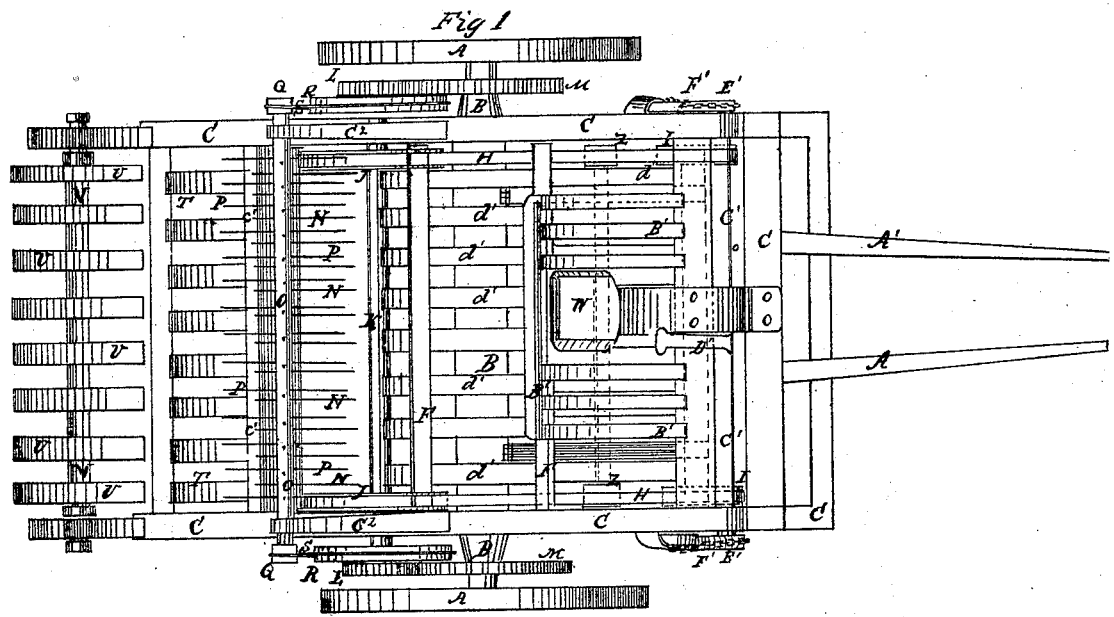
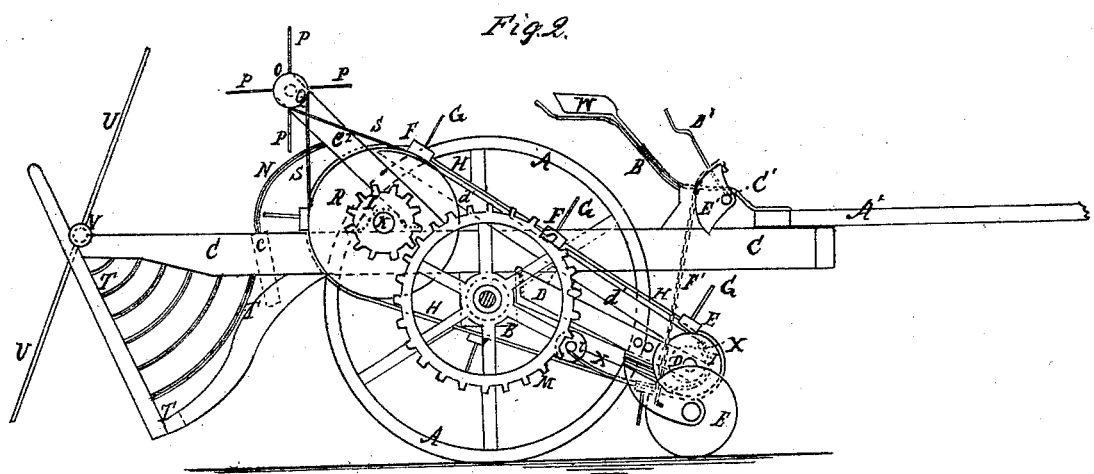
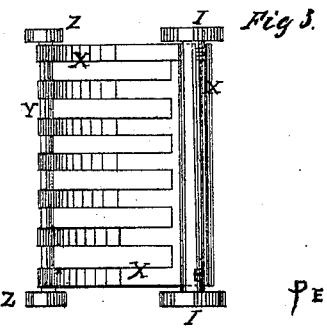
Witnesses: Inventor:

United States Patent Office.

FREDERICK A. THAYER, OF SHELDONVILLE, MASSACHUSETTS.

Letters Patent No. 114,065, dated April 25, 1871.

IMPROVEMENT IN COMBINED HAY-RAKES AND TEDDERS.

The Schedule referred to in these Letters Patent and making part of the same.

*To all whom it may concern:*

Be it known that I, FREDERICK A. THAYER, of Sheldonville, in the county of Norfolk and State of Massachusetts, have invented a new and improved Hay-Rake and Tedder; and I do hereby declare that the following is a full, clear, and exact description thereof, which will enable others skilled in the art to make and use the same, reference being had to the accompanying drawing forming part of this specification, in which—

Figure 1 is a top or plan view of my improved machine.

Figure 2 is a side view of the same, one of the drive-wheels being removed.

Figure 3 is a detail view of the tension device.

Similar letters of reference indicate corresponding parts.

My invention has for its object to furnish a simple and convenient machine, which shall be so constructed and arranged that it may be used as a rake for collecting the hay into windrows, or simply for tedding the hay, doing the work equally well in either capacity.

I will first describe my invention in connection with all that is necessary to a full understanding thereof, and then clearly point it out in my claim.

A are the drive-wheels of the machine, to the axle B of which the frame C is securely attached.

D is a frame, the upper edge of which is hinged to the frame C in front of the axle B, and the lower edge of which is supported upon the small wheels E, the bent axles of which should be adjustably attached to the frame D, so that the lower edge of said frame may be supported closer to or further from the ground, as may be desired.

$d'$ is a slotted frame, which forms an inclined apron, over which the grain or hay is transferred by the carrier-rake.

This apron is hinged on the top upon two uprights, which are supported on the transverse shaft K, while it is attached at the bottom to the swinging frame D.

F are cross-bars, provided with teeth G, and the ends of which are securely attached to the endless bands or chains H.

The bands or chains H pass around wheels I pivoted to the lower parts of the side bars of the hinged frame D, and around the wheels J attached to the shaft K, which revolves in bearings attached to the frame C, so that, by the revolution of the shaft K, the rake F G H may be operated to raise the hay from the ground and carry it up the inclined apron $d'$.

To the ends of the shaft K are attached small gear-wheels L, into the teeth of which mesh the teeth of the large gear-wheels M attached to the drive-wheels A or to the hub of said drive-wheels, so that the rake may be operated by the advance of the machine.

N are curved teeth attached to the cross-bar $c'$ of the frame C, and the upper ends of which extend up so as to be directly opposite to the upper ends of the inclined bars of the apron $d'$, and at such a distance from them as only to leave room between them for the passage of the bars F, the teeth G passing between the teeth or arms N.

The curve of the teeth or arms N is larger than the curve of the wheels J, so that, as the bars F move forward, the teeth G may move inward with reference to the teeth N, leaving the hay upon the said teeth N.

O is a shaft revolving in bearings in the upper ends of the arms $c^2$, the lower ends of which are rigidly attached to the frame C.

The shaft O is provided with rows of teeth P of such a length as to reach nearly to the teeth N, so that, as the shaft O is revolved, the teeth P may push the hay downward upon the teeth N and prevent its lodging upon said teeth N, and thus clogging the machine.

To the ends of the shaft O are attached small wheels or pulleys Q, around which, and around the wheels R attached to the shaft K, pass the bands S, so that the toothed shaft O may be revolved by the advance of the machine.

From the teeth N the hay falls into the receptacle T attached to the frame C, and the rear side of which is formed by the bars U, attached at their middle parts to the shaft V, which works in bearings attached to the rear parts of the frame C.

The shaft B should be provided with levers, gearing, or other well-known device, so that, when enough hay has been received in the receptacle T to form a section of a windrow, the shaft V may be revolved by the driver from his seat W through half a revolution, sweeping the collected hay from the receptacle T and bringing the shaft and bars V U again into position to retain the hay in the receptacle.

X is a pivoted and rear-slotted swinging frame, the forward part of which is a bar or roller pivoted to the forward edge of the hinged frame D, fig. 3.

To the rear edge of X is attached a shaft, Y, having pulley Z pivoted to its ends. These latter rest upon chains H, which are held taut by the weight of frame X. This causes the rake to sweep evenly through the stubble.

$A'$ are the shafts, which are attached to the forward part of the frame C, as shown in figs. 1 and 2.

The driver's seat W may be provided with fenders $B'$ to prevent the driver from being annoyed by the hay as it is being carried up by the rake.

$C'$ is a shaft working in bearings in the forward part of the frame C in such a position that the said shaft may be conveniently operated by the driver from his seat by means of the foot-lever D' attached to said shaft C'.

To the ends of the shaft C' are attached wheels or segments of wheels E', to which are attached the upper ends of the chains F', the lower ends of which are attached to the forward part of the hinged frame D, so that the frame D and rake F G H can be conveniently raised from the ground when required to pass obstructions, or for any other desired purpose.

When the machine is to be used as a tedder the shaft V and cross-bars U are secured in the position shown in fig. 2, so that the hay may pass out of the receptacle T as fast as it enters said receptacle.

Having thus described my invention,

What I claim as new, and desire to secure by Letters Patent, is—

1. The hinged frame D, vertically adjustable between the wheels E E, in combination with the hinged apron d', as and for the purpose described.

2. The endless rake F G H, the pivoted swinging frame X, the hinged frame D, and the pivoted apron d,' all combined, as described, in a hay-rake and tedder.

3. The arms N and traveling rake-teeth F G combined with the revolving rake-teeth P, when all are arranged to operate in different vertical planes, as described.

4. The curved arms N to receive the hay, the revolving rake P to remove it, the receptacle T to contain it, and the rotary clearer U to throw it off in sections of a windrow, all combined to operate as described.

FREDERICK A. THAYER.

Witnesses:
BENJAMIN COLLINS,
GEORGE S. SHELDON.